United States Patent
Bianchi et al.

(10) Patent No.: US 9,674,678 B2
(45) Date of Patent: *Jun. 6, 2017

(54) ARCHITECTURE FOR SIGNAL AND POWER DISTRIBUTION IN WIRELESS DATA NETWORK

(71) Applicant: CommScope Technologies LLC, Hickory, NC (US)

(72) Inventors: Charles H. Bianchi, Durham, NH (US); Ken C. Greenwood, Bedford, NH (US); John Sabat, Jr., Merrimack, NH (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/341,205

(22) Filed: Jul. 25, 2014

(65) Prior Publication Data

US 2014/0334474 A1    Nov. 13, 2014

Related U.S. Application Data

(63) Continuation of application No. 13/110,159, filed on May 18, 2011, now Pat. No. 8,824,457, which is a
(Continued)

(51) Int. Cl.
*H04W 4/18* (2009.01)
*H04L 12/28* (2006.01)
(Continued)

(52) U.S. Cl.
CPC ........... *H04W 4/18* (2013.01); *H04L 12/2801* (2013.01); *H04W 88/08* (2013.01); *H04W 84/12* (2013.01); *H04W 88/14* (2013.01)

(58) Field of Classification Search
CPC .... H04M 7/0024; H04W 4/18; H04L 12/2801
(Continued)

(56) References Cited

U.S. PATENT DOCUMENTS

| 4,183,054 A | 1/1980 | Patisaul et al. |
| 4,392,245 A | 7/1983 | Mitama |

(Continued)

FOREIGN PATENT DOCUMENTS

| EP | 0391597 | 10/1990 |
| EP | 0827339 | 3/1998 |

(Continued)

OTHER PUBLICATIONS

U.S. Patent and Trademark Office, "Notice of Allowance", "U.S. Appl. No. 10/606,655", Aug. 1, 2007, pp. 1-4.
(Continued)

*Primary Examiner* — William Deane, Jr.
(74) *Attorney, Agent, or Firm* — Fogg & Powers LLC

(57) ABSTRACT

An architecture is provided for coupling wireless local area network (WLAN) signals between an internetworking device and a remotely located access point using a transport network. The access point is coupled to the transport network for communicating with the internetworking device. The access point includes a wireless local area network (WLAN) access point and an access point remote converter. The WLAN access point receives wireless local area network signals from wireless computing equipment and converts such signals to local area network compatible signals. The access point remote converter receives the local area network compatible signals from the WLAN access point and converts the signals to transport modulated format signals suitable for transmission over the transport network.

32 Claims, 7 Drawing Sheets

Related U.S. Application Data continuation of application No. 10/806,032, filed on Mar. 22, 2004, now Pat. No. 7,969,965, and a continuation of application No. 10/869,468, filed on Jun. 16, 2004, now Pat. No. 8,379,569, said application No. 10/806,032 is a continuation-in-part of application No. 10/606,655, filed on Jun. 26, 2003, now Pat. No. 7,359,392, said application No. 10/869,468 is a continuation-in-part of application No. 10/606,655, which is a continuation-in-part of application No. 09/332,518, filed on Jun. 14, 1999, now Pat. No. 6,587,479.

(60) Provisional application No. 60/130,445, filed on Apr. 21, 1999.

(51) Int. Cl.
  *H04W 88/08* (2009.01)
  *H04W 84/12* (2009.01)
  *H04W 88/14* (2009.01)

(58) Field of Classification Search
  USPC ....... 379/201.01, 413.03, 220, 230; 455/422, 455/1, 557; 370/352, 410, 338, 329
  See application file for complete search history.

(56) References Cited

U.S. PATENT DOCUMENTS

| | | |
|---|---|---|
| 4,611,323 A | 9/1986 | Hessenmuller |
| 4,628,501 A | 12/1986 | Loscoe |
| 4,654,843 A | 3/1987 | Roza et al. |
| 4,691,292 A | 9/1987 | Rothweiler |
| 4,999,831 A | 3/1991 | Grace |
| 5,067,173 A | 11/1991 | Gordon et al. |
| 5,129,098 A | 7/1992 | McGirr et al. |
| 5,193,109 A | 3/1993 | Lee |
| 5,193,223 A | 3/1993 | Walczak et al. |
| 5,243,598 A | 9/1993 | Lee |
| 5,303,287 A | 4/1994 | Laborde |
| 5,321,736 A | 6/1994 | Beasley |
| 5,321,849 A | 6/1994 | Lemson |
| 5,339,184 A | 8/1994 | Tang |
| 5,381,459 A | 1/1995 | Lappington |
| 5,396,484 A | 3/1995 | Itoh |
| 5,421,030 A | 5/1995 | Baran |
| 5,452,473 A | 9/1995 | Weiland et al. |
| 5,463,623 A | 10/1995 | Grimes et al. |
| 5,467,384 A | 11/1995 | Skinner, Sr. |
| 5,475,870 A | 12/1995 | Weaver, Jr. et al. |
| 5,487,069 A | 1/1996 | O'Sullivan et al. |
| 5,499,241 A | 3/1996 | Thompson et al. |
| 5,513,176 A | 4/1996 | Dean et al. |
| 5,515,014 A | 5/1996 | Troutman |
| 5,590,173 A | 12/1996 | Beasley |
| 5,598,412 A | 1/1997 | Griffith et al. |
| 5,613,190 A | 3/1997 | Hylton |
| 5,613,191 A | 3/1997 | Hylton et al. |
| 5,621,786 A | 4/1997 | Fischer et al. |
| 5,627,879 A | 5/1997 | Russell et al. |
| 5,636,211 A | 6/1997 | Newlin et al. |
| 5,642,405 A | 6/1997 | Fischer et al. |
| 5,644,522 A | 7/1997 | Moyse et al. |
| 5,644,622 A | 7/1997 | Russell et al. |
| 5,657,374 A | 8/1997 | Russell et al. |
| 5,717,737 A | 2/1998 | Doviak et al. |
| 5,765,099 A | 6/1998 | Georges et al. |
| 5,768,279 A | 6/1998 | Barn et al. |
| 5,781,541 A | 7/1998 | Schneider |
| 5,781,859 A | 7/1998 | Beasley |
| 5,802,173 A | 9/1998 | Hamilton-Piercy et al. |
| 5,805,983 A | 9/1998 | Naidu et al. |
| 5,809,395 A | 9/1998 | Hamilton-Piercy et al. |
| 5,822,324 A * | 10/1998 | Kostresti ............... H04L 65/604 348/E5.002 |
| 5,852,651 A | 12/1998 | Fischer et al. |
| 5,949,775 A | 9/1999 | Rautiola et al. |
| 5,953,670 A | 9/1999 | Newson |
| 5,956,331 A | 9/1999 | Rautiola et al. |
| 5,969,837 A | 10/1999 | Farber et al. |
| 5,978,650 A | 11/1999 | Fischer et al. |
| 5,983,070 A | 11/1999 | Georges et al. |
| 5,999,813 A | 12/1999 | Lu et al. |
| 6,005,884 A * | 12/1999 | Cook ................... H04W 88/085 370/338 |
| 6,014,546 A | 1/2000 | Georges et al. |
| 6,081,716 A | 6/2000 | Lu |
| 6,122,529 A | 9/2000 | Sabat, Jr. et al. |
| 6,141,763 A | 10/2000 | Smith et al. |
| 6,151,480 A | 11/2000 | Fischer et al. |
| 6,157,810 A | 12/2000 | Georges et al. |
| 6,192,216 B1 | 2/2001 | Sabat, Jr. et al. |
| 6,205,495 B1 | 3/2001 | Gilbert et al. |
| 6,223,021 B1 | 4/2001 | Silvia et al. |
| 6,233,443 B1 | 5/2001 | Brommer |
| 6,259,910 B1 * | 7/2001 | Fairfield ............. H04W 88/085 455/422.1 |
| 6,301,240 B1 | 10/2001 | Slabinski et al. |
| 6,336,042 B1 | 1/2002 | Dawson |
| 6,349,200 B1 | 2/2002 | Sabat, Jr. et al. |
| 6,353,728 B1 | 3/2002 | Fischer et al. |
| 6,360,075 B1 | 3/2002 | Fischer et al. |
| 6,374,124 B1 | 4/2002 | Slabinski |
| 6,415,132 B1 | 7/2002 | Sabat, Jr. |
| 6,426,970 B1 | 7/2002 | Thornton et al. |
| 6,480,702 B1 | 11/2002 | Sabat, Jr. |
| 6,513,163 B1 | 1/2003 | Silvia et al. |
| 6,535,493 B1 | 3/2003 | Lee et al. |
| 6,535,983 B1 * | 3/2003 | McCormack ........... G06F 1/266 370/410 |
| 6,546,425 B1 | 4/2003 | Hanson et al. |
| 6,560,213 B1 * | 5/2003 | Izadpanah ............. H04W 84/14 370/278 |
| 6,560,441 B1 | 5/2003 | Sabat, Jr. et al. |
| 6,584,146 B2 | 6/2003 | Bose et al. |
| 6,587,479 B1 | 7/2003 | Bianchi et al. |
| 6,597,912 B1 | 7/2003 | Lu et al. |
| 6,608,832 B2 | 8/2003 | Forslow |
| H2079 H | 9/2003 | Menon et al. |
| 6,654,428 B1 | 11/2003 | Bose et al. |
| 6,704,545 B1 | 3/2004 | Wala |
| 6,785,255 B2 | 8/2004 | Sastri et al. |
| 6,831,901 B2 | 12/2004 | Millar |
| 6,836,898 B1 * | 12/2004 | Yates ..................... H04N 7/104 348/E7.052 |
| 6,853,637 B1 | 2/2005 | Norrell et al. |
| 6,876,864 B1 | 4/2005 | Chapin |
| 6,963,552 B2 | 11/2005 | Sabat, Jr. et al. |
| 7,069,045 B2 | 6/2006 | Wu et al. |
| 7,085,553 B1 | 8/2006 | Harrenstien et al. |
| 7,099,707 B2 * | 8/2006 | Amin ..................... H04M 19/08 379/413.03 |
| 7,117,015 B2 | 10/2006 | Scheinert et al. |
| 7,173,285 B2 * | 2/2007 | Hallin ..................... C30B 19/12 257/628 |
| 7,173,922 B2 | 2/2007 | Beach |
| 7,184,428 B1 * | 2/2007 | Gerszberg ........... H04L 12/2856 370/352 |
| 7,215,651 B2 | 5/2007 | Millar |
| 7,228,429 B2 * | 6/2007 | Monroe ................ G08B 25/085 713/182 |
| 7,257,122 B1 | 8/2007 | Keturi |
| 7,359,392 B2 | 4/2008 | Bianchi et al. |
| RE40,564 E | 11/2008 | Fischer et al. |
| 7,969,965 B2 | 6/2011 | Bianchi et al. |
| 8,379,569 B2 | 2/2013 | Bianchi et al. |
| 2001/0001268 A1 * | 5/2001 | Menon ............. H04L 29/12009 370/329 |
| 2001/0036841 A1 | 11/2001 | Wilson |
| 2001/0037395 A1 | 11/2001 | Sabat, Jr. et al. |
| 2002/0016170 A1 | 2/2002 | Sabat, Jr. et al. |

(56) References Cited

U.S. PATENT DOCUMENTS

| | | | |
|---|---|---|---|
| 2002/0037717 | A1 | 3/2002 | Laube et al. |
| 2004/0073937 | A1 | 4/2004 | Williams |
| 2005/0018655 | A1 | 1/2005 | Bianchi et al. |
| 2005/0047355 | A1 | 3/2005 | Wood et al. |
| 2005/0243785 | A1 | 11/2005 | Sabat, Jr. et al. |
| 2007/0147278 | A1 | 6/2007 | Millar |

FOREIGN PATENT DOCUMENTS

| | | |
|---|---|---|
| GB | 2253770 | 9/1992 |
| GB | 2289198 | 11/1995 |
| GB | 2300549 | 11/1996 |
| WO | 9115927 | 10/1991 |
| WO | 9732442 | 9/1997 |
| WO | 9829922 | 7/1998 |

OTHER PUBLICATIONS

U.S. Patent and Trademark Office, "Supplemental Notice of Allowance", "U.S. Appl. No. 10/606,655", Sep. 18, 2007, pp. 1-8.

U.S. Patent and Trademark Office, "Office Action", "U.S. Appl. No. 10/606,655", Apr. 18, 2007, pp. 1-11.

U.S. Patent and Trademark Office, "Office Action", "U.S. Appl. No. 10/806,032", Mar. 24, 2008, pp. 1-32.

U.S. Patent and Trademark Office, "Office Action", "U.S. Appl. No. 10/806,032", Sep. 18, 2008, pp. 1-13.

U.S. Patent and Trademark Office, "Office Action", "U.S. Appl. No. 10/806,032", Apr. 15, 2009, pp. 1-7.

U.S. Patent and Trademark Office, "Office Action", "U.S. Appl. No. 10/806,032", Mar. 15, 2010, pp. 1-8.

U.S. Patent and Trademark Office, "Office Action", "U.S. Appl. No. 10/806,032", Sep. 2, 2010, pp. 1-5.

U.S. Patent and Trademark Office, "Final Office Action", "U.S. Appl. No. 10/869,468", Jul. 8, 2008, pp. 1-10.

U.S. Patent and Trademark Office, "Final Office Action", "U.S. Appl. No. 10/869,468", Oct. 16, 2009, pp. 1-14.

U.S. Patent and Trademark Office, "Final Office Action", "U.S. Appl. No. 10/869,468", Mar. 14, 2011, pp. 1-10.

U.S. Patent and Trademark Office, "Office Action", "U.S. Appl. No. 10/869,468", Apr. 30, 2007, pp. 1-10.

U.S. Patent and Trademark Office, "Office Action", "U.S. Appl. No. 10/869,468", Oct. 19, 2007, pp. 1-22.

U.S. Patent and Trademark Office, "Office Action", "U.S. Appl. No. 10/869,468", Mar. 20, 2009, pp. 1-10.

U.S. Patent and Trademark Office, "Office Action", "U.S. Appl. No. 10/869,468", Mar. 16, 2010, pp. 1-15.

U.S. Patent and Trademark Office, "Office Action", "U.S. Appl. No. 10/869,468", Sep. 20, 2010, pp. 1-9.

U.S. Patent and Trademark Office, "Office Action", "U.S. Appl. No. 10/869,468", Mar. 29, 2012, pp. 1-31.

Ayanoglu et al., "Wireless ATM: Limits, Challenges and Proposals", "IEEE Personal Communications", Aug. 1996, pp. 18-34, vol. 3, No. 4, Publisher: IEEE.

Boyle, "Freedom to Roam", "PC Magazine", Feb. 20, 1996, pp. 175-177, 180-182, 18.

Chan et al., "Network Architecture and Traffic Transport for Integrated Wireless Communications Over Enterprise Networks", "Wireless Networks 3", 1997, pp. 181-194, Publisher: J.C. Baltzer AG, Science Publishers.

Chow et al., "A Multi-Drop In-House ADSL Distribution Network", "CC'94 New Orleans, Louisiana May 1-5, 1994", 1994, pp. 456-460, Publisher: IEEE.

Comer et al., "An Architecture for a Campus-Scale Wireless Mobile Internet", "Purdue Technical Report CSD-TR-95-058", 1995, pp. 1-12, Publisher: Purdue University.

"Wireless LAN: Proxim Shipping Its Low-Cost, Easy-To-Use Symphony Cordless Networking Solution to Home and Soho Customers", "Edge: Work Group Computing Report", Oct. 5, 1998, pp. 1-2, Publisher: Edge Publishing.

"Wireless Proxim to Deliver Wireless LAN Connectivity for Microsoft Windows CE 2.0 (Openair 2.4 Standards)", "Edge: Work-Group Computing Report", Oct. 20, 1997, p. 11, vol. 8, Publisher: Edge Publishing.

"Wireless: Proxim Wireless LAN Access Points to Be Incorporated Into Motorola Wireless Thin-Client Solution", "Edge: Work-Goup Comuputing Report", Sep. 1, 1997, p. 1, vol. 8, Publisher: Edge Publishing.

"Wireless: Proxim Announces Token Ring Wirless LAN Access Point; Separately Announces Industry's First Web Browser-Based ", "Edge: Work-Group Computing Report", Jul. 28, 1997, p. 41, vol. 8, Publisher: Edge Publishing.

Estrin et al., "Cable Television Networks as an Alternative to the Local Loop", "Journal of Telecommunications, Networks", 1984, pp. 103-115, vol. 3, No. 2, Publisher: Computer Science Press Inc., Published in: Maryland, US.

"Hardware-Desktop Communications; Winter 1999 Technology Buyer's Guide Special Issue", "Fortune Special", Nov. 16, 1998, p. 134, Publisher: Time Inc.

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

Harvey et al., "Cordless Communications Utilising Radio Over Fibre Techniques for the Local Loop", "IEEE International Conference on Communications", Jun. 1991, pp. 1171-1175, Publisher: IEEE.

Anonymous, "IEEE 802.20 Will Set Data Rates Above 1 MBPS for Mobile Users", "Microwave Journal", Apr. 2003, p. 57, vol. 46, No. 4, Publisher: Proquest Computing.

LAN/MAN Standards Committee, "Part 11: Wireless LAN Media Access Control (MAC) and Physical Layer (PHY) Specifications ", "IEEE Standard for Information technology", Mar. 29, 2012, pp. 1-96, Publisher: IEEE Computer Society.

Anonymous, "IEEE Standard 802.16 Sets Stage for Growth of Metropolitan Area Networks", "Microwave Journal", Feb. 2002, p. 51 vol. 45, No. 2, Publisher: Proquest Computing.

Lansford, "Home RF: Brining Wireless Connectivity Home", Mar. 9, 1999, pp. 1-27, Publisher: Intel Corporation.

Lin, "An Architecture for a Campus-Sized Wireless Mobile Network", Dec. 1996, pp. 1-157, Publisher: Purdue University.

Negus et al., "Home RF and Swap: Wireless Networking for the Connected Home", "Mobile Computing and Communications Review", 1998, pp. 28-37, vol. 2, No. 7, Publisher: ACM SIGMOBILE.

"Home Networking Goes Mainstream", "PC World (via Google Groups)", Nov. 16, 1998, pp. 13-14, Published in: Las Vegas, NV.

"Proxim Now Shipping Industry's First Cordless Solution for Shared Broadband Internet Access to Home and Soho Customers", "http://web.archive.org/web/19990508095349/www.proxim.com/about/pressroom/1999pr/s . . . ", Feb. 22, 1999, pp. 1-3, Publisher: Proxim, Published in: Mountain View, CA.

Silva et al., "Interworking Dect With Ethernet for Low Cost Wireless LANS", "ICUPC '98 IEEE 1998 International Conference on Universal Personal Communications Conference Proceedings", 1998, pp. 727-731, vol. 1, Publisher: IEEE, Published in: New York, NY.

"Symphony—Cordless Networking Product", "http://web.archive.org/web/19990508002708/http://www.proxim.com/symphony/products/", May 8, 1999, pp. 1-6, Publisher: PROXIM.

Yan, "Wireless Data", "Aspen Technology Summit", Jun. 3, 1998, pp. 1-21.

Zorzi, "Mobile and Wireless Telecommunication Networks", Feb. 18, 1998, No. 1-38, Publisher: Center for Wireless Communications, University of California San Diego.

European Patent Office, "European Search Report for Application No. 00303366.9", "from Foreign Counterpart to U.S. Appl. No. 09/332,518", Feb. 13, 2003, pp. 1-3, Published in: EP.

U.S. Patent Office, "Notice of Allowance", "from U.S. Appl. No. 10/606,655", Nov. 26, 2007, pp. 1-7, Published in: US.

U.S. Patent Office, "Notice of Allowance", "from U.S. Appl. No. 10/806,032", Sep. 24, 2009, pp. 1-6, Published in: US.

(56) References Cited

OTHER PUBLICATIONS

U,S. Patent Office, "Notice of Allowance"; "from U.S. Appl. No. 10/806,032", Feb. 18, 2011, pp. 1-5, Published in: US.
U.S. Patent Office, "Notice of Allowance", "from U.S. Appl. No. 10/869,468", Oct. 10, 2012, pp. 1-12, Published in: US.
U.S. Patent Office, "Notice of Allowance", "from U.S. Appl. No. 13/110,159", Apr. 25, 2014, pp. 1-7, Published in: US.
U.S. Patent Office, "Office Action", "from U.S. Appl. No. 13/110,159", Jan. 16, 2014, pp. 1-22, Published in: US.
U.S. Patent Office, "Restriction Requirement", "from U.S. Appl. No. 13/110,159", May 8, 2013, pp. 1-6, Published in: US.
U.S. Patent Office, "Restriction Requirement", "from U.S. Appl. No. 13/110,159", Sep. 25, 2013, pp. 1-6, Published in: US.

* cited by examiner

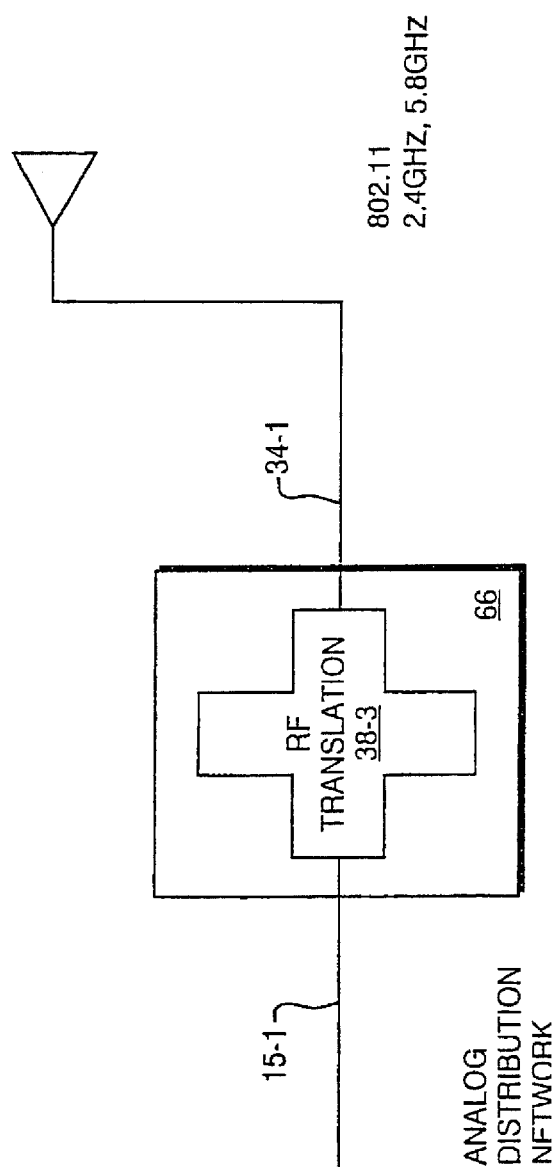

ARCHITECTURE FOR SIGNAL AND POWER DISTRIBUTION IN WIRELESS DATA NETWORK

CROSS-REFERENCE TO RELATED APPLICATIONS

This application is a continuation of U.S. application Ser. No. 13/110,159, filed May 18, 2011 which is a continuation of U.S. application Ser. No. 10/806,032, filed Mar. 22, 2004 now U.S. Pat. No. 7,969,965, and U.S. application Ser. No. 10/869,468, filed Jun. 16, 2004 now U.S. Pat. No. 8,379,569, each of which are continuations-in-part of U.S. application Ser. No. 10/606,655, filed Jun. 26, 2003, now U.S. Pat. No. 7,359,392, which is a continuation-in-part of U.S. application Ser. No. 09/332,518, filed Jun. 14, 1999, now U.S. Pat. No. 6,587,479, which claims the benefit of U.S. Provisional Application Ser. No. 60/130,445, filed Apr. 21, 1999. The entire teachings of the above applications are incorporated herein by reference.

BACKGROUND

The present invention relates generally to wireless local area network systems and more particularly to a distribution network for coupling wireless local area network signals between centrally located internetworking devices and remotely located access points.

The most common user applications for personal computers now require a connection to a computer network of some type. Such applications include the viewing of e-mail, sharing of data files, and accessing the Internet and the World Wide Web. Various techniques are used for connecting computers together so that they may send data to and receive data from each other, more or less in real time. Most often this so-called physical layer is implemented using wires and the bits of data to be exchanged are converted into electrical signals that move through the wires. Traditionally, local area networks (LANs) were implemented using privately installed wiring, such as coaxial cable or twisted pair type cable and network adapter circuits. Later, it became possible to construct LANs through the use of the public switched telephone network and modem equipment.

However, networks that use infrared light or radio frequency energy at the physical layer are growing in popularity. These so-called wireless local area networks ("wireless LANs") convert the bits of data into radio waves to enable their transmission over the air, which in turn minimizes the need for hard wired connections.

Wireless LANs have tended to find application where user mobility and portability is important, such as in the healthcare, retail, manufacturing, and warehousing industries. This limited use has no doubt been the result of the added cost of the required wireless network adapters. However, they are also becoming more widely recognized as a general purpose alternative for a broad range of business applications as the cost of mobile computing equipment such as laptop computers and personal digital assistants (PDAs) continues to decrease. With a wireless LAN, users can access shared information without first stopping to find a place to plug-in their equipment. In addition, network managers can set up or augment such networks without installing or moving wires around from place to place.

The simplest wireless LAN configuration is an independent type network that connects a set of computers with wireless adapters. Anytime any two or more of the wireless adapters are within radio range of one another, they can set up a network. More common is a type of multi-user LAN wherein multiple devices referred to as access points collect signals at a central location. The access points collect signals transmitted from personal computers equipped with wireless network adapters, and distribute them over wire physical media to other internetworking devices such as repeaters (hubs), bridges, routers, and gateways, to provide interconnectivity to larger networks.

The range of a wireless LAN is limited by how far the signals can travel over the air between the access points and the network adapters connected to the PCs. Currently, the Institute of Electrical and Electronic Engineers (IEEE) 802.11 wireless LAN standard, which is the most widely used, specifies power output levels which carry signals over a few hundred feet.

To extend coverage beyond this limited range, a network of access points with overlapping radio ranges must be located throughout the desired coverage area. These so-called infrastructure wireless LANs are implemented in a manner which is similar to a cellular telephone system. At any given time, a mobile personal computer equipped with a wireless LAN adapter communicates with a single access point within the current microcell within which it is located. On the landline side, the access points are interconnected using network-compatible twisted pair wiring such as that which is compliant with the Ethernet/802.3 10 baseT or 100 baseT standard. The network signals can then be further forwarded to a local- or wide-area network using standard internetworking protocols and devices.

SUMMARY

The present invention provides a simple and low cost architecture for coupling wireless local area network ("wireless LAN") signals between geographically distributed access points and centrally located internetworking devices. The invention eliminates complexities involved with the deployment of such systems in the past, which have typically required the computer network-compatible wiring to be extended to each access point directly from an internetworking device such as a repeater, bridge, router, or gateway.

The present invention makes it economically efficient to deploy wireless local area networking equipment in locations where wired network infrastructure is not readily available. In particular, any convenient existing physical wiring, such as may be provided by the existing coaxial cable used to distribute cable television signals, or the existing twisted pair cabling used to distribute standard telephone signals, is used as a physical layer transport medium to carry the wireless local area network signals between the access points and centrally located network hub equipment.

According to the invention, an architecture is provided that couples wireless local area network (WLAN) signals between an internetworking device and a remotely located access point using a transport network. The access point is coupled to the transport network for communicating with the internetworking device. The access point includes a wireless local area network (WLAN) access point and an access point remote converter. The WLAN access point receives wireless local area network signals from wireless computing equipment and converts such signals to local area network compatible signals. The access point remote converter receives the local area network compatible signals from the WLAN access point and converts the signals to transport modulated format signals suitable for transmission over the transport network. The transport network also provides a power signal to power at least some components of the access point.

The transport network can be implemented as an analog signal transport medium. In one particular embodiment, the transport network is a twisted pair telephone cabling and the access point remote converter converts the local area network signals to a Digital Subscriber Line (xDSL) format. The access point further includes a power supply connected to be energized by the power signal from the transport network to supply power to at least some components of the access point.

In another particular embodiment, the transport network is an optical fiber network and the access point remote converter converts the local area network signals to an optical wavelength compatible with the fiber network. The access point further includes a power supply connected to be energized by the power signal from the optical fiber network to supply power to at least some components of the access point.

A power inserter can be used for inserting the power signal onto the transport network and a signal coupler can also be used to couple the power signal from the transport network to the access point.

A head end access point that includes a head end remote bridge can be connected to receive the transport modulated format signals from the transport network and to convert such signals to data network compatible signals. A local area network hub can then be used to receive the data network compatible signals from the head end remote bridge and to forward such signals to the internetworking device.

In further particular embodiments, an access point is associated with each wireless local area network microcell. The access point includes access point equipment for communicating with portable computing equipment located within the microcell, such as may be provided in accordance with standard wireless network specifications such as the Institute of Electrical and Electronic Engineers (IEEE) 802.11 wireless LAN standard.

Rather than couple the wire line side of the access point directly through local area network format cabling such as 10 baseT or 100 baseT, an access point remote converter first converts such signals to a convenient transport format. The transport format implemented by the remote converter depends upon the available cabling.

The available transport cabling can also provide a power signal to power at least some portions of the access point.

The transport signals are collected at a central distribution or headend access point (HAP). At this location, a remote bridge then converts the signals from the convenient transport format back to the wired local area network format such as Ethernet/802.3 10 baseT or 100 baseT. These Ethernet signals are then suitable for coupling to a local area network hub, or other internetworking equipment such as repeaters, bridges, routers, gateways and the like.

As a result, it is not necessary to deploy Ethernet-compatible or other data network cabling directly to the physical location of each access point within the desired coverage area. Rather, the access points may be deployed in configurations wherever there is available transport cabling, without consideration for the cost and/or logistics of deploying local area network compatible cabling.

DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 7 is a more detailed block diagram of an alternative implementation of the cable access point.

DETAILED DESCRIPTION

Figure 1:
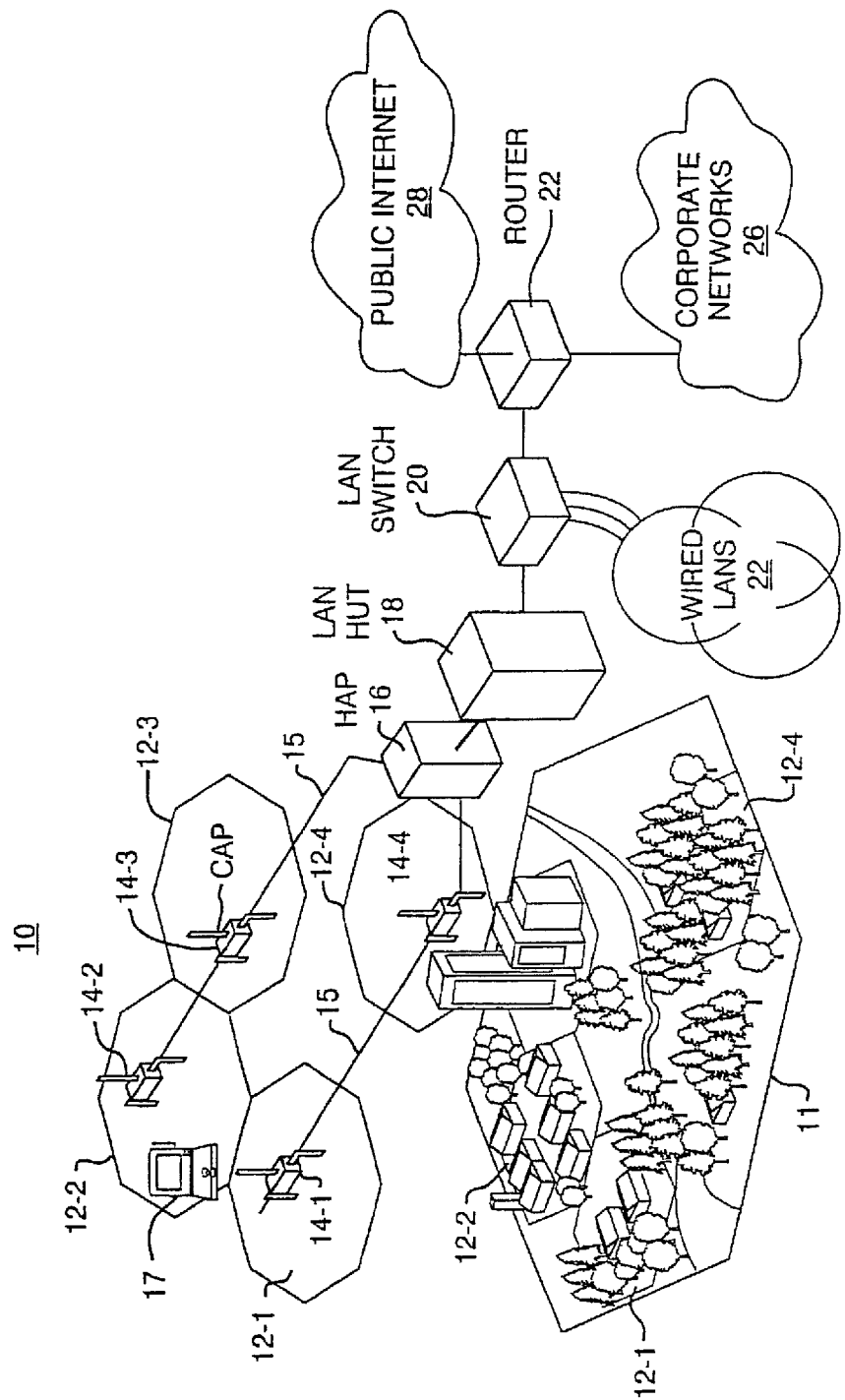
FIG. 1 is a diagram of a system for providing wireless local area network access using transport cabling according to the invention.

Turning attention now to the drawings, FIG. 1 is a generalized diagram of a wireless data network 10 configured according to the invention. The wireless data network 10 makes use of multiple remotely located wireless local area network (LAN) access point locations to provide wireless LAN interconnectivity over a broad coverage area. The wireless data network 10 uses widely available, already installed cabling such as a coaxial cable, optical fiber, or twisted pair as a transport medium. This architecture provides an inexpensive way to deploy wireless LAN coverage from a centralized internetworking device without the need to distribute LAN compatible cabling to each access point location in a geographic region 11.

More specifically, the wireless data network 10 consists of a number of microcells 12-1, 12-2, . . . , 12-4 distributed throughout a geographic region. Some of the microcells 12 may be located adjacent to other microcells and located in areas of particularly high population density, such as in an office park. Other microcells 12 may be located in residential and/or rural areas, such as microcell 12-4, and may have no adjacent microcells 12.

The present invention allows the implementation of wireless data network 10 in areas where data network wired backbone infrastructure is not readily available. For example, in the residential or rural area 12-4, such data network infrastructure is not available. Likewise, the invention can be advantageously deployed even in areas such as the office park in microcell 12-3 where such backbone connections may already be available. In this case, the invention provides a way to distribute access points throughout a wide geographic region 11 without the need to provide network connectivity to each access point, such as through leased data lines or other transport media requiring expensive monthly rental payments.

Each microcell 12 has associated with it a corresponding cable access point (CAP) 14-1, 14-2, . . . , 14-4. The cable access points 14 are connected to one another either serially or in parallel via an intercell transport medium 15. It will be understood shortly the transport medium 15 is advantageously selected to be an existing wiring located in the region 11. For example, the transport medium 15 is selected to be a cable television (CATV) cable plant, or twisted pair cabling used to provide plain old telephone service (POTS).

Heretofore, it has been required to provide a high speed, wired connection such as an Ethernet/802.3 10 baseT or 100 baseT compatible connection to each of the microcells 12-1 in order to carry wireless local area network signals from the access points 14 back to an internetworking device such as a LAN repeater or hub 18. However, the invention uses especially adapted cable access points 14 and head end access points (HAPs) 16 in order to transport the wireless local area network signals over the available transport media 15.

The head end access point (HAP) 16 couples the LAN signals between the available transport medium 15 and internetworking equipment such as a LAN repeater or hub 18. From the LAN hub 18, the signals may then be fed through LAN switches 20 to wired LANs 22, through routers 22 to corporate networks 26 or public backbone Internet connections 28, or to other internetworking equipment.

Figure 2:
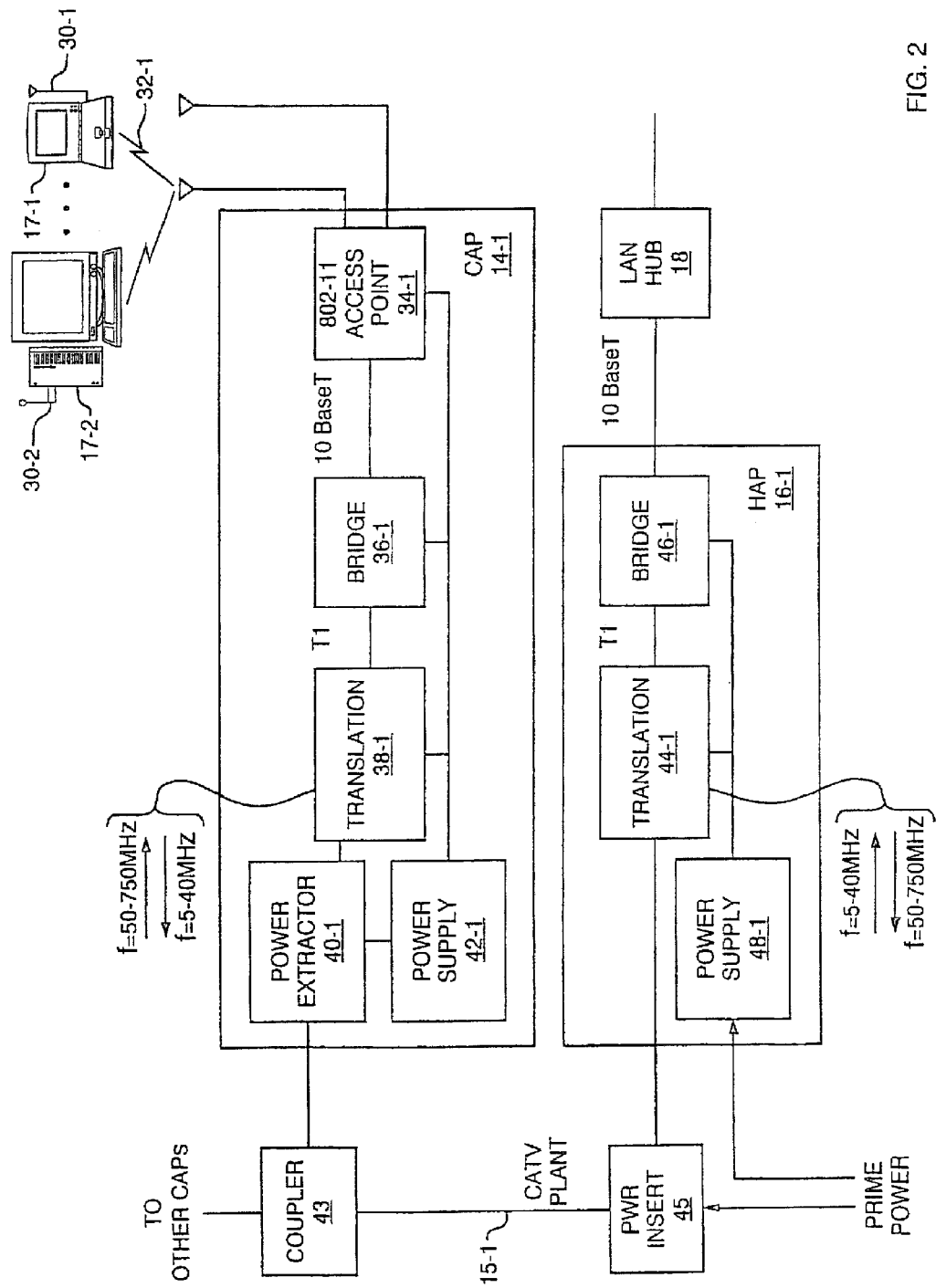
FIG. 2 is a more detailed block diagram of a cable access point and head end access point making use of a cable television transport media.

FIG. 2 is a more detailed diagram of a CAP 14-1 and HAP 16-1 that make use of existing CATV plant transport medium 15-1. The CAP 14-1 includes an access point 34-1, a remote bridge 36-1, a radio frequency (RF) translator 38-1, power extractor 40-1 and power supply 42-1. Although only a single CAP 14-1 is shown connected to the CATV plant 15-1, it should be understood that other CAPs 14 are similarly connected to the HAP 16-1.

The CAP 14-1 receives wireless LAN signals from computing equipment 17-1 and 17-2 located within its respective microcell 12-1. For example, mobile computing equipment 17-1 such as a laptop computer or personal digital assistant (PDA) may be fitted with a wireless LAN adapter 30-1 which transmits and receives wireless LAN signals 32-1 to and from a wireless LAN access point 34-1. It should be understood that in addition to the portable type computing equipment 17-1, there may also be desktop computers 17-2 located within the microcell 12, equipped with wireless LAN adapters 30-2.

The following discussion considers the path of a reverse link direction signal that is traveling from the computer 17 towards the LAN hub 18. However, it should be understood that communication paths in a network are full duplex and therefore must travel in both directions; the analogous inverse operations are therefore carried out in the forward link direction.

The radio signals transmitted by the wireless LAN adapter 30-1 and the wireless access point 34-1 are preferably in accordance with the known standardized signaling format such as the Institute of Electrical and Electronic Engineers (IEEE) 802.11 wireless LAN standard. The access point 34-1 and wireless LAN adapter 30-1 are therefore available as inexpensive, off-the-shelf items.

The network side port of the access point 34-1 is, in the preferred embodiment, most commonly provided as a standardized Ethernet type signal compatible with 10 baseT or 100 baseT standard signaling. The remote bridge 36-1 thus converts the Ethernet signals provided by the access point 34-1 to a format suitable for connecting such signals over long distances, depending upon the available transport medium 15.

In the case of the illustrated CATV plant 15-1, the bridge 36-1 modulates such signals to a standard line signaling formats such as T1 carrier format. However, rather than bring the T1 compatible telecommunication line signaling directly to the location of the CAP 14-1 in the microcell 12, the T1 formatted signal is instead provided to a translator 38-1. The translator 38-1 up-converts the T1 signal to an appropriate intermediate frequency (IF) carrier for coupling over the CATV plant 15-1. For example, the 1.5 MHz bandwidth T1 signal may, in the reverse link direction, be upbanded to a carrier in the range of from 5-40 MHz. In the forward link direction, that is, signals being carried from the central LAN hub 18 towards the computers 17, the translator 38-1 receives signals on the intermediate frequency carrier in a range from 50-750 MHz and translates them down to a baseband T1 signaling format.

The power inserter 45 may be located at any point in the CATV plant 15-1, and inserts a suitable low frequency alternating current (AC) power signal. This signal energizes the power extractor 40-1 and power supply 42-1 to generate a direct current supply signal for the CAPs 14. A signal coupler 43 couples this AC power signal and the intermediate frequency signal energy from the translator 38-1 to the CATV plant 15-1, and vice versa.

The head end access point (HAP) 16-1 contains a power supply 48-1, translator 44-1, and remote bridge 46-1. The translator 44-1 provides the inverse function of the translator 38-1. That is, in the reverse link direction, it converts the T1 formatted signals from the intermediate frequency carrier in a range of from 5-40 MHz back down to the baseband T1 format.

In the forward link direction, the translator 44-1 accepts signals converted from the LAN hub 18 through the bridge 46-1, upbanding them onto a convenient carrier such as in the range of from 50-750 MHz for coupling over the CATV plant 15-1.

For more information concerning the details of a suitable translator 38-1 and 44-1, reference can be had to a co-pending U.S. patent application Ser. No. 08/998,874 filed Dec. 24, 1997 entitled "Remotely Controlled Gain Control of Transceiver Used to Interconnect Wireless Telephones to a Broadband Network."

The remote bridge 46-1 then reconverts the translated reverse link signals back to Ethernet compatible signals, such as 10 baseT or 100 baseT signals which may then be processed by the LAN hub 18 or other compatible internetworking devices.

It should be understood that the CATV plant 15-1 may be replaced by other types of broadband distribution networks which may be conveniently available within the area 11. The one consideration which cannot be altered is that the end-to-end propagation delays of the remoting medium must be considered to comply with the end-to-end delay criteria specified by the Ethernet/802.3 standard. For example, optical transport media may also be used in the place of the coaxial cable used for the CATV plant 15-1, such as described in a co-pending U.S. patent application Ser. No. 09/256,244 filed Feb. 23, 1999 entitled "Optical Simulcast Network with Centralized Call Processing."

Figure 3:
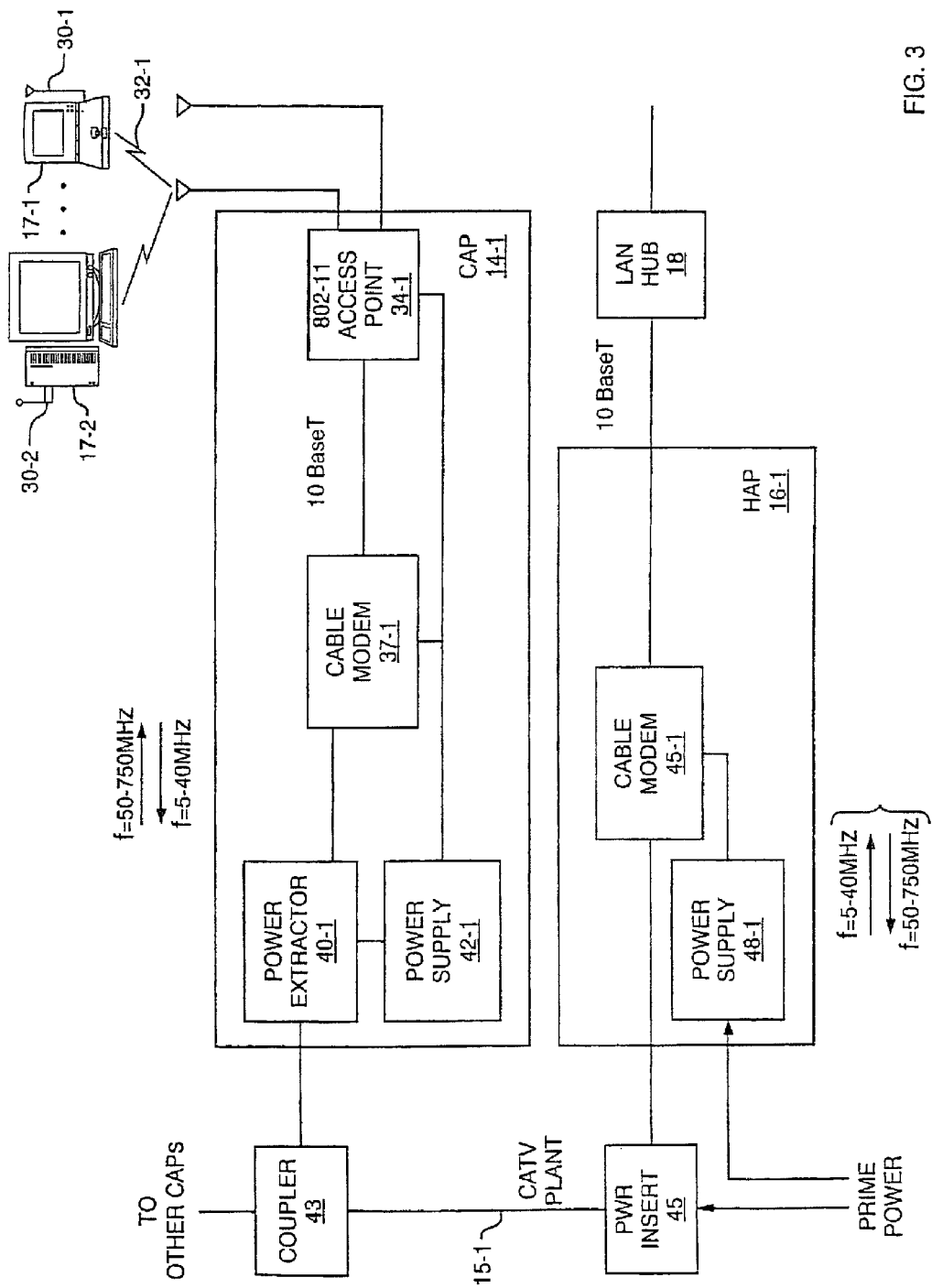
FIG. 3 is a block diagram of a cable access point and head end access point making use of a cable transport with IEEE 802.14 cable modem compatible interconnects.

FIG. 3 is a block diagram of an embodiment of the CAP 14 and HAP 16 using cable modem equipment. In this embodiment, a cable modem 37-1 replaces the bridge 36-1 and translator 38-1. The cable modem 37-1 may be IEEE 802.14, Multimedia Cable Network System (MCNS), or Data Over Cable Service Interface Specification (DOCSIS) compatible. The net result is the same in that the Ethernet signals used for communication with the access point 34-1 are converted to cable signals in the 5-750 MHz bandwidth.

Figure 4:
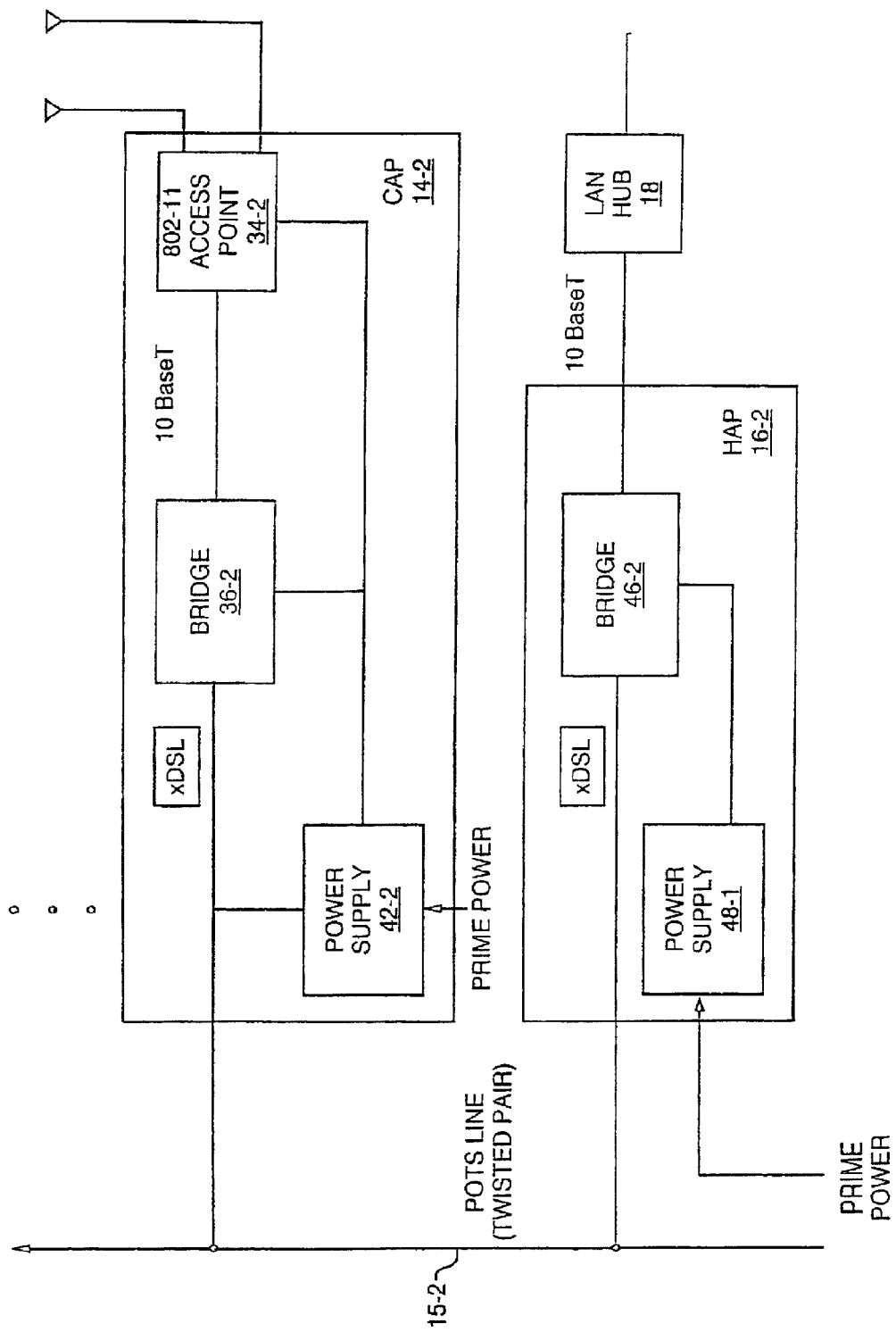
FIG. 4 is a block diagram of a cable access point and head end access point using a twisted pair transport media.

FIG. 4 illustrates an alternative embodiment of the CAP 14-2 and HAP 16-2 which use twisted pair type transport medium 15-2. As before, a wireless LAN compatible access point 34-2 provides Ethernet/802.3 compatible signals to a remote bridge 36-2. In this instance, the remote bridge 36-2 provides a high speed digital output signal compatible with digital subscriber line (xDSL) signaling technology. Such xDSL technology uses sophisticated modulation schemes to pack data onto standard copper twisted pair wires.

Likewise, the bridge 46-2 disposed within the HAP 16-2 is compatible for converting xDSL signaling to Ethernet/802.3 signaling. The embodiment of FIG. 4 may typically be more advisable to use in areas 11 having readily available twisted pair copper wires such as used for carrying standard telephone signaling, and wherein such signaling requires only a short run to a local central telephone office of 20,000 feet shorter distance compatible with xDSL specifications.

The understanding therefore is that the bridge 36-1 or 36-2 and 46-1 or 46-2 may be any suitable type of layer two (L2) bridging to the appropriate available transport media 15-1 or 15-2, be it up-converted T1 over cable or fiber, or xDSL.

Figure 5:
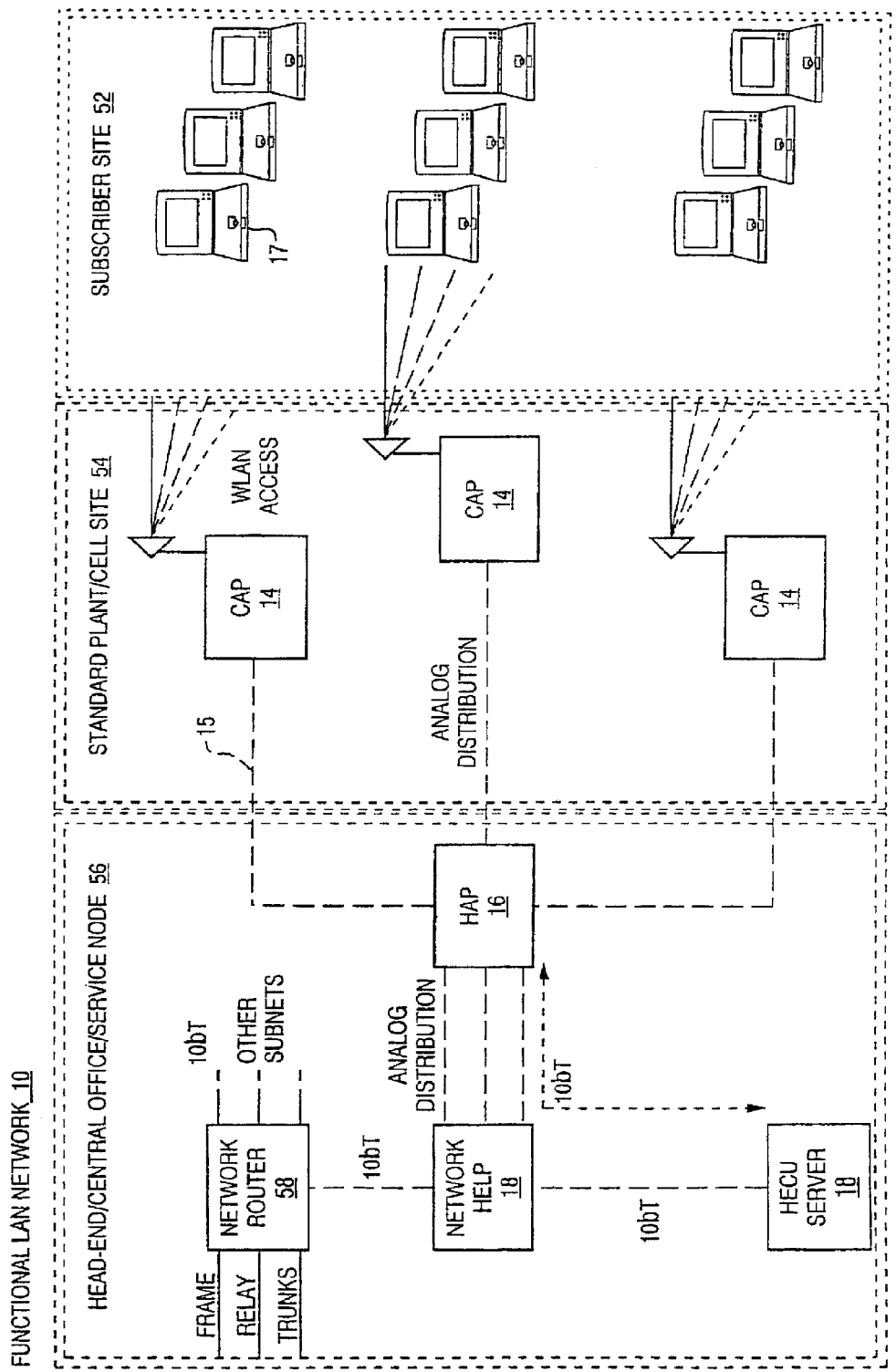
FIG. 5 is a more detailed block diagram of the typical equipment deployed at the head end.

A complete implementation for a local area network 10 may thus be as shown in FIG. 5. In particular, the subscriber site 52 contains the remotely located computers 17. They exchange wireless local area network signaling with devices located with the CAPs 14 located at the stranded plant microcell sites 54. In turn, the CAPs 14 use an analog distribution network implemented using whatever transport medium 15 that is readily available. The HAP 16 may itself use other analog distribution networks converts such analog signals back to appropriate Ethernet/802.3 signal formatting and forwards them to the hub 18. The hub 18 thus provides local area network signals such as compatible with the 10 baseT standard, to network router 58 which may provide such signals to other networks over whatever long distance digital signaling is appropriate, such as to other local sub-networks over Ethernet/802.3 10 baseT type signaling, or to other remote locations such as over frame relay trunks.

Figure 6:
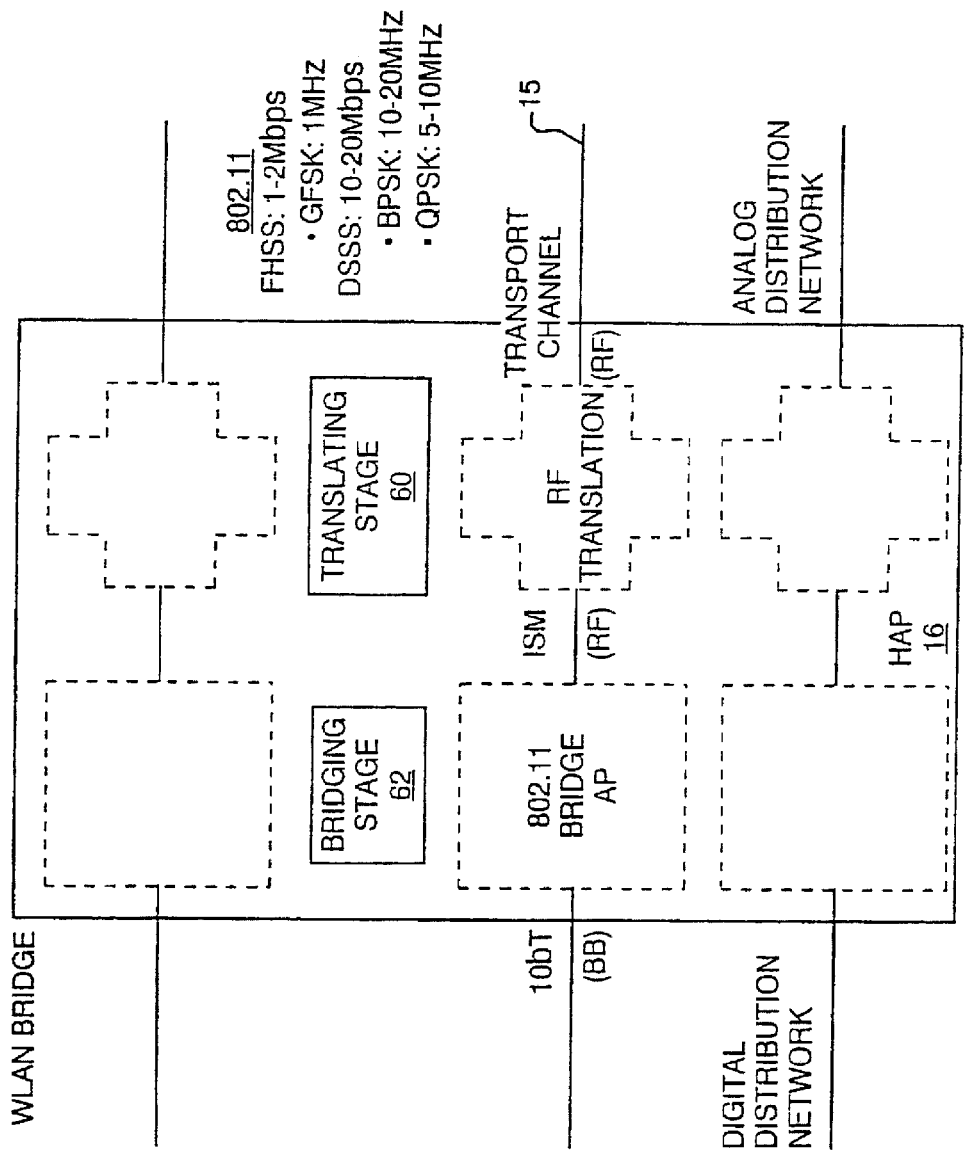
FIG. 6 is a more detailed diagram of the head end access point making use of a wireless local area network bridge and translation stage.

FIG. 6 is a detailed view of an alternate embodiment of the HAP 16. Here, the 802.11 air interface signal is translated in frequency to CATV transport frequencies between the HAP 16 and CAP 14. The HAP 16 consists generally of a translating stage 60 and bridging stage 62. A translating stage 60 provides an radio frequency translation function, accepting signals from the transport medium 15 and converting their radio band of operation. In this particular embodiment of the HAP 16, the bridging stage 62 is provided by an 802.11 compatible wireless bridge. This device accepts signals from a wireless local area network at baseband and converts them to the 802.11 protocol for frequency conversion by the translating stage 60. In this instance then, the translating stage 60 disposed between the bridging stage and the transport medium 15 converts the IF signaling used on the CATV transport medium 15 in the range of 5-750 MHz to the signaling in the ISM band compatible with the 802.11 wireless bridging stage 62.

Finally, FIG. 7 shows an alternate embodiment of the CAP 14 that uses a direct RF translator 38-3 to interface between the CATV transport medium 15 and the 802.11 format signals in the unlicensed ISM bands (e.g., 2.4 GHz or 5.8 GHz). In particular, the analog distribution network signals in the 5-750 MHz band are translated in frequency up to an ISM band carrier by the RF translator 38-3.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An access point system comprising:
    a wireless local area network (WLAN) access point to produce an intermediate signal based on a wireless local area network (WLAN) signal received from equipment within a coverage area associated with the wireless local area network (WLAN) access point; and
    a modem unit to produce, based on the intermediate signal produced by the wireless local area network (WLAN) access point, a transport modulated format signal suitable for transmission over transport cabling.

2. The access point system of claim 1, wherein the intermediate signal comprises a wired local area network (LAN) signal.

3. The access point system of claim 2, wherein the wireless local area network (WLAN) signal comprises an IEEE 802.11 wireless local area network (WLAN) signal and the local area network (LAN) signal comprises an IEEE 802.3 network signal.

4. The access point system of claim 1, wherein the wireless local area network (WLAN) signal comprises a multi-user wireless local area network (WLAN) signal.

5. The access point system of claim 1, wherein the transport cabling comprises a portion of a cable television plant and wherein the modem unit comprises a cable modem.

6. The access point system of claim 1, wherein the transport cabling comprises telephone twisted-pair cabling and wherein the modem unit comprises a digital subscriber line modem.

7. The access point system of claim 1, wherein the equipment comprises at least one of: computing equipment, mobile equipment, and a personal digital assistant.

8. The access point system of claim 1, wherein:
    the modem unit produces a downstream intermediate signal based on a downstream transport modulated format signal received from the transport cabling; and
    the wireless local area network (WLAN) access point produces a downstream wireless local area network (WLAN) signal from the downstream intermediate signal; and
    the wireless local area network (WLAN) access point radiates the downstream wireless local area network (WLAN) signal within the coverage area.

9. The access point system of claim 8, wherein the downstream intermediate signal comprises a downstream wired local area network (LAN) signal.

10. The access point system of claim 1, wherein the transport cabling comprises fiber optic cabling.

11. The access point system of claim 1, further comprising a power supply adapted to receive power from the transport cabling and power at least a portion of at least one of the wireless local area network (WLAN) access point and the modem unit.

12. A system for coupling a wireless device to a network, the system comprising:
    a wireless local area network (WLAN) access point adapted for wireless local area network (WLAN) communication with one or more wireless devices within a coverage area associated with the wireless local area network (WLAN) access point; and
    a converter located within the coverage area;
    wherein the wireless local area network (WLAN) access point is communicatively coupled to the converter, the converter being adapted to communicate with the network;

wherein the wireless local area network (WLAN) access point communicates with the converter using a wired format signal according to a first wired protocol; and wherein the converter converts the wired format signal to a transport format for communication over distribution cabling out of the coverage area and to the network, the distribution cabling comprising at least one of POTS cabling, cable television cabling, and optical fiber cabling.

13. The system of claim 12, wherein the wireless local area network (WLAN) access point is located in a common housing with the converter.

14. The system of claim 12, wherein the wired format signal is an IEEE 802.3 compliant signal.

15. The system of claim 12, wherein the plurality of wireless devices comprises at least one of computing equipment, mobile equipment, and a personal digital assistant.

16. The system of claim 12, wherein the wireless local area network (WLAN) access point includes a bridge that converts at least one portion of a wireless signal into the wired format signal.

17. The system of claim 12, wherein the wireless local area network (WLAN) communication between the plurality of wireless devices and the wireless local area network (WLAN) access point uses wireless signals compliant with an IEEE 802.11 protocol.

18. The system of claim 12, wherein the wireless local area network (WLAN) communication comprises a multi-user wireless local area network (WLAN) communication.

19. The system of claim 12, wherein the converter comprises a cable modem.

20. The system of claim 12, wherein the transport format for broadband communication is digital subscriber line signaling.

21. The system of claim 12, wherein the first wired protocol is an Ethernet protocol.

22. The system of claim 12, wherein at least one of the wireless local area network (WLAN) access point and the converter are powered at least in part using power received from the distribution cabling.

23. An apparatus for communicatively coupling wireless devices to a network, the apparatus comprising:
a wireless local area network (WLAN) access point that receives a wireless local area network (WLAN) signal from at least one wireless device and that converts the wireless local area network (WLAN) signal to a wired local area network (LAN) signal; and
a converter that converts the wired local area network (LAN) signal to a transport signal suitable for transmission to the network over at least one of plain old telephone service (POTS) cabling, cable television cabling, and optical fiber cabling.

24. The apparatus of claim 23, wherein the transport signal is suitable for broadband transmission to the network.

25. The apparatus of claim 23, wherein the wireless local area network (WLAN) access point is located in a common housing with the converter.

26. The apparatus of claim 23, wherein the at least one wireless device comprises at least one of computing equipment, mobile equipment, and a personal digital assistant.

27. The apparatus of claim 23, wherein the wired local area network (LAN) signal conforms to an IEEE 802.3 protocol.

28. The apparatus of claim 23, wherein the wireless local area network (WLAN) signal conforms to an IEEE 802.11 protocol.

29. The apparatus of claim 23, wherein the wireless local area network (WLAN) signal comprises a multi-user wireless local area network (WLAN) signal.

30. The apparatus of claim 23, wherein the converter comprises a cable modem.

31. The apparatus of claim 23, wherein the converter converts the wired local area network (LAN) signal to a digital subscriber line signaling format for transport over POTS cabling.

32. The apparatus of claim 23, wherein at least one of the wireless local area network (WLAN) access point and the converter are powered at least in part from power received from the network.

* * * * *